(12) United States Patent
Casey

(10) Patent No.: US 7,859,814 B2
(45) Date of Patent: Dec. 28, 2010

(54) LINEAR LOW CAPACITANCE OVERVOLTAGE PROTECTION CIRCUIT USING A BLOCKING DIODE

(75) Inventor: Kelly C. Casey, Flower Mound, TX (US)

(73) Assignee: Littelfuse, Inc., Des Plaines, IL (US)

( * ) Notice: Subject to any disclaimer, the term of this patent is extended or adjusted under 35 U.S.C. 154(b) by 713 days.

(21) Appl. No.: 11/865,138

(22) Filed: Oct. 1, 2007

(65) Prior Publication Data

US 2008/0094766 A1 Apr. 24, 2008

Related U.S. Application Data

(60) Provisional application No. 60/852,895, filed on Oct. 19, 2006.

(51) Int. Cl.
*H02H 9/00* (2006.01)
(52) U.S. Cl. ...................................... 361/119
(58) Field of Classification Search ................. 361/119
See application file for complete search history.

(56) References Cited

U.S. PATENT DOCUMENTS

| | | | |
|---|---|---|---|
| 3,609,512 A | 9/1971 | Lewis | |
| 4,456,991 A * | 6/1984 | Chea et al. | 370/359 |
| 5,008,602 A | 4/1991 | Stevens et al. | |
| 5,198,957 A * | 3/1993 | Welty et al. | 361/18 |
| 5,326,994 A | 7/1994 | Giebel et al. | |
| 6,259,123 B1 | 7/2001 | Kelberlau et al. | |
| 6,580,789 B1 | 6/2003 | Simpson et al. | |
| 6,876,742 B1 | 4/2005 | Sacca | |
| 7,224,052 B2 | 5/2007 | Nishizawa et al. | |
| 7,266,195 B1 | 9/2007 | Dupuis et al. | |
| 7,489,488 B2 * | 2/2009 | Vos et al. | 361/91.5 |
| 7,515,391 B2 * | 4/2009 | Casey | 361/56 |
| 2004/0070050 A1 | 4/2004 | Chi | |
| 2004/0188818 A1 | 9/2004 | Wang | |

OTHER PUBLICATIONS

Office Action in U.S. Appl. No. 11/254,164, dated Jan. 28, 2008.
Office Action in U.S. Appl. No. 11/254,163, dated Jan. 22, 2008.
Office Action in U.S. Appl. No. 11/254,162, dated Apr. 08, 2008.
Jon Schleisner, High Speed Data Line Protection, Applicaiotn Notes, Jul. 18, 2002, 3 pages.

* cited by examiner

*Primary Examiner*—Stephen W Jackson
(74) *Attorney, Agent, or Firm*—Kacvinsky Daisak, PLLC

(57) ABSTRACT

A low capacitance overvoltage protection circuit (80) provides protection to a communication line (12, 14). A diode bridge (46) is connected to the communication line (12, 14) so that overvoltages of both polarities pass through an overvoltage protection device (44) in one direction. A bias voltage supply 48 applies a bias voltage across a semiconductor overvoltage protection device (44) through isolation resistors (64, 66) to make the capacitance of the device (44) independent of changes in communication line voltages. When line voltages exceed the magnitude of the bias voltage, a blocking diode (82) prevents current from flowing through the bias voltage supply (48) in a reverse direction.

21 Claims, 6 Drawing Sheets

LINEAR LOW CAPACITANCE OVERVOLTAGE PROTECTION CIRCUIT USING A BLOCKING DIODE

RELATED APPLICATIONS

This non-provisional patent application claims the benefit of pending provisional application entitled "Linear Low Capacitance Overvoltage Protection Circuit Using Blocking Diode", filed Oct. 19, 2006, Ser. No. 60/852,895. The entire disclosure of the provisional application is incorporated herein by reference. This application is related to pending application Ser. No. 11/254,162, filed Oct. 19, 2005.

TECHNICAL FIELD OF THE INVENTION

The present invention relates in general to overvoltage protection devices and circuits, and more particularly to overvoltage protection circuits providing low capacitance protection to communication lines.

BACKGROUND OF THE INVENTION

Many circuits in electronic equipment provide protection from the harmful effects of overvoltages, overcurrents, etc. These protection circuits are often designed as an integral part of the general electronic circuit, but may be added thereto as ancillary devices or circuits.

Protection circuits may often be constructed on silicon substrates, such as bipolar transistors, diodes or thyristors. Silicon bipolar devices can carry large magnitudes of current and thus are well adapted for use in protecting electronic circuits from damage by overvoltages and overcurrents. Solid state bipolar devices constructed with junctions have an inherent capacitance that is a function of the width of the depletion region. The depletion region in a semiconductor junction functions as the "dielectric" layer of a capacitor. Since the width of the depletion region varies with the voltage impressed across the junction, the capacitance of a bipolar semiconductor junction varies as a function of the voltage applied across the junction. Capacitors whose values vary with voltage are inherently nonlinear devices. In other words, a bipolar overvoltage protection device placed across a circuit to be protected can affect the operation of the circuit even if the overvoltage protection device remains in its off state. The non-linearity can lead to suboptimal channel performance and intermodulation distortion.

The adverse affects of the foregoing are experienced in many applications, including communication lines where overvoltage protection circuits are routinely employed to protect transmitting and receiving circuits from high voltages that may be inadvertently coupled to the communication lines. Many devices in the thyristor family can be employed to respond to the overvoltage condition and provide a low impedance path between the communication line and ground, or other path where the energy is safely dissipated.

The adverse affects of the use of silicon bipolar overvoltage protection devices may not arise from the fact that such devices have an inherent capacitance, but rather from the characteristic that the capacitance changes as a function of the voltage, frequency and temperature to which the device is subjected. As an example, many communication lines are adapted for carrying high speed digital signals of various protocols, including ADSL, T1, E1, ADSL2+, ADSL2++, 10BaseT, VDSL, VDSL2, T3, 100BaseT and others. Many of these protocols are carried between remote destinations by way of modems or other transmission and receiving circuits.

In order to optimize the transmission of high speed data, many modems utilize an initial process of selecting the proper equalization components so that the digital signals can be transmitted at the highest speed permitted by the frequency response of the line and the circuits associated with the line. The equalization parameters selected by the modem are those that exist at the time equalization testing is carried out. This is usually once when the modem is placed in service, and on each reboot thereof after initial operation. It can be seen that if the electrical state of the line changes after the equalization session, the transmission data rate may not be optimized, and thus transmission errors can occur.

An example of transmission inefficiencies can arise in connection with the following example. A modem placed on line or booted into operation will be programmed to automatically carry out an equalization process for determining the best electrical parameters to be switched into operation to optimize high speed data transmission. The modem will be connected to the communication line, such as a telephone DSL line adapted for carrying VDSL or other data signals. An on-hook state (of the telephone set) of the DSL line for carrying digital signals is typically 48 volts. After the modem has completed the equalization process, it is situated to provide optimum transmission of the VDSL signals, based on the electrical characteristics of the DSL communication line that existed during the equalization process. Typically, the modem will adapt the voltage magnitude of the digital signals as a function of the length of the communication line so that the lowest power level is achieved while yet minimizing the transmission data error rate.

During an actual communication session by a user in which the VDSL signals are being transmitted at a high rate, assume that the user's telephone set connected to the same DSL communication line is placed in an off-hook condition. In other words, the user is simultaneously using the DSL communication line for both verbal communications with the telephone set, and for data communications using the modem. This off-hook condition places a different set of voltages on the communication line. The communication line goes from a 48-volt on-hook state to about a 10-volt off-hook state. As such, the capacitance of the overvoltage protection devices, and possibly other devices, will change with changing voltages, thus modifying the electrical characteristics of the lines to which the modem was equalized. With the communication line now having different electrical characteristics, the effective transmission rate may be lowered, but the modem keeps transmitting at the rate optimized during the equalization session. As a result, the data receiver or modem at the receiving end of the communication line may detect errors arising from the transmission of data at a rate higher than the line can reliably carry in the off-hook condition. The excessive error rate may cause the modem to retrain, which results in a temporary loss of service during the retraining session. This is generally unacceptable and annoying to the user.

From the foregoing, it can be seen that a need exists for a technique for making overvoltage protection devices and circuits less prone to changes in capacitance as a function of voltage, and thereby reduce the change in electrical characteristics of the devices or circuits connected to the lines. Another need exists for an overvoltage protection circuit that includes a bias voltage applied to the overvoltage protection device to minimize changes in capacitance as a function of voltage applied across the device, and in which the magnitude of the bias voltage need not be greater than the line voltages experienced by the line to be protected. Still another need exists for an overvoltage protection circuit in which a bias voltage is applied to an overvoltage protection device for minimizing the change in capacitance of the device as a function of both voltage and frequency applied across the device, and also as a function of the temperature of the overvoltage protection device.

SUMMARY OF THE INVENTION

In accordance with an important feature of the overvoltage protection circuit of the invention, a bipolar overvoltage protection device is biased with a voltage to reduce the change in capacitance as a function of voltage applied to the device. In addition, at least one blocking diode is placed in series with the bias voltage supply to prevent current from flowing therethrough in a reverse direction. With this arrangement, when high voltages normally occurring on the line to be protected are present, a current flow path through the bias supply is avoided, which would otherwise contribute to the capacitance of the circuit.

In accordance with one embodiment of the invention, disclosed is an overvoltage protection circuit which includes a diode bridge and an overvoltage protection device connected between opposite nodes of the diode bridge. A terminal of the overvoltage protection circuit is adapted for connection to a bias voltage is coupled to linearize a capacitance characteristics of the overvoltage protection device. At least one blocking diode is connected between the bias voltage terminal and the overvoltage protection device to prevent current from flowing in a reverse direction through the bias voltage supply that provides the bias voltage.

According to another embodiment of the invention, disclosed is an overvoltage protection circuit which includes an overvoltage protection device responsive to an overvoltage for being driven into a low voltage conduction state. A conductor is provided for coupling a DC bias voltage to the overvoltage protection device to lower a capacitance thereof. At least one blocking diode is provided in the bias voltage conductor, and the blocking diode is forward biased by the DC bias voltage.

According to another embodiment of the invention, discloses is an overvoltage protection circuit which includes a bridge rectifier having at least four diodes, a first and second diode of the bridge having cathodes thereof connected to a first node, and a third and fourth diode of the bridge having anodes thereof connected to a second node. The anode of the first diode and a cathode of the third diode are connected to a third node of the bridge, and the third node of the bridge is adapted for connection to a first communication line conductor. The anode of the second diode and a cathode of the fourth diode are connected to a fourth node of the bridge, and the fourth node of the bridge is adapted for connection to a second communication line conductor. An overvoltage protection device is connected between the first and second nodes of the bridge. A first blocking diode is connected in series with a first isolation resistor to form a junction therebetween and first and second terminals. The first terminal of the series connected first blocking diode and first isolation resistor are connected to the first node of the diode bridge, where the first blocking diode is arranged to allow current to flow into the first node of the diode bridge. The second terminal of the series connected first blocking diode and first isolation resistor are adapted for connection to a first terminal of a bias voltage supply. A second blocking diode is connected in series with a second isolation resistor to form a junction therebetween and third and fourth terminals. The third terminal of the series connected second blocking diode and second isolation resistor are connected to the second node of the diode bridge, where the second blocking diode is arranged to allow current to flow out of the second node of the diode bridge. The fourth terminal of the series connected second blocking diode and second isolation resistor is adapted for connection to a second terminal of the bias voltage supply.

According to yet another embodiment of the invention, disclosed is a method of protecting a communication line from overvoltages. The method includes the steps of using a thyristor to provide overvoltage protection to a communication line, and biasing the thyristor with a bias voltage to linearize the capacitance of the thyristor and reduce changes in capacitance with changes in voltages carried by the communication line. Current is prevented from flowing in a reverse direction through a supply of the bias voltage to further linearize the capacitive loading of the thyristor when the voltage on the communication line exceeds the magnitude of the bias supply voltage.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION

Figure 1:
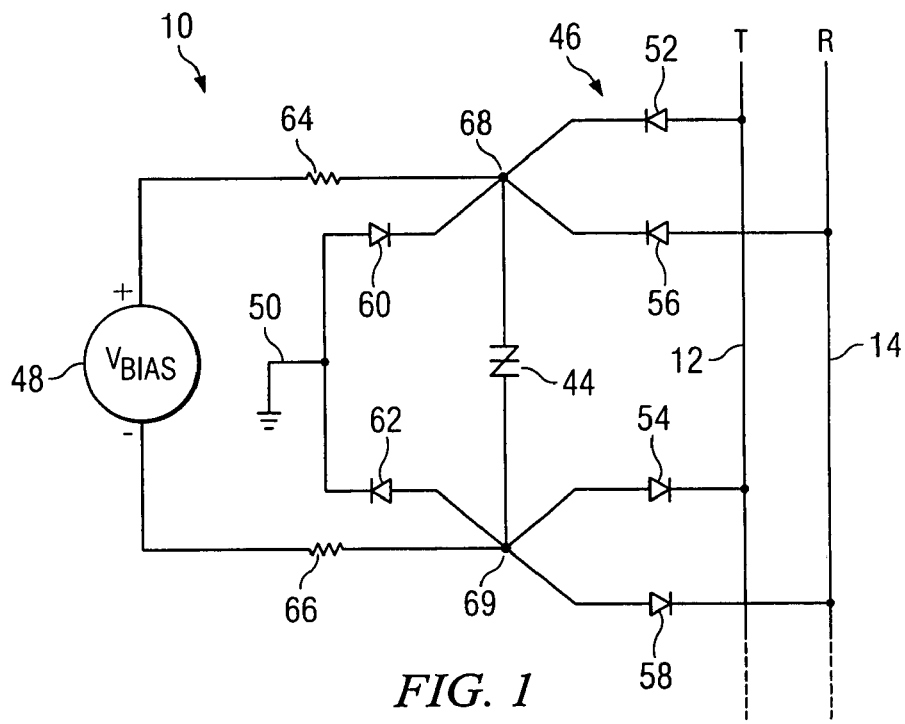
FIG. 1 is a schematic drawing of an overvoltage protection circuit which linearizes the capacitance of the thyristor device.

With reference to FIG. 1, there is shown a overvoltage protection circuit 10 adapted for protecting low voltage communication lines, such as ADSL, T1, E1, ADSL2+, ADSL2++, 10BaseT, VDSL, VDSL2, T3, 100BaseT and others. This overvoltage protection circuit 10 is described in detail in pending U.S. application Ser. No. 11/254,162 filed Oct. 19, 2005. This overvoltage protection circuit 10 can be connected across a communication line, such as a telephone line having a tip conductor 12 and a ring conductor 14. In the event that a voltage exceeding the breakover voltage ($V_{BO}$) of the overvoltage device 44 is coupled to one or both of the communication line conductors 12 or 14, the overvoltage device 44 will be driven into conduction through the diode bridge 46 and short circuit the current to ground 50. The overvoltage can exist between the communication line conductors 12 and 14, between the conductor 12 and ground 50, between the conductor 14 and ground 50, or between both conductors 12 and 14 and ground 50. The bridge 46 allows a unidirectional overvoltage device 44 to be employed to couple overvoltages of either polarity to ground 50.

According to an important feature of this circuit 10, a bias voltage 48 is applied across the overvoltage protection device 44, which may be a unidirectional Sidactor overvoltage protection device obtainable under the brand name Teccor, from Littelfuse, Inc., Irving, Tex. The utilization of a bias voltage applied across the overvoltage protection device 44 linearizes the capacitive characteristics of the circuit 10. By this, it is meant that the variations in capacitance ($\Delta c$) as a function of the voltage and frequency to which the circuit 10 is subjected, is reduced. In addition, changes in capacitance resulting from changes in the operating temperature of the overvoltage protection device are reduced. Accordingly, the $\Delta c$ characteristics as a function of changes in voltage, frequency and temperature are more linear and are more independent of changes in such parameters. In gigabit Ethernet applications, the biasing of the overvoltage protection device has made a marked improvement in reducing errors in an environment in which the temperature either changes, or remains at an elevated level. Indeed, the greater the bias voltage, the less the change in capacitance of the circuit as function of voltage, frequency and temperature.

Figure 2:
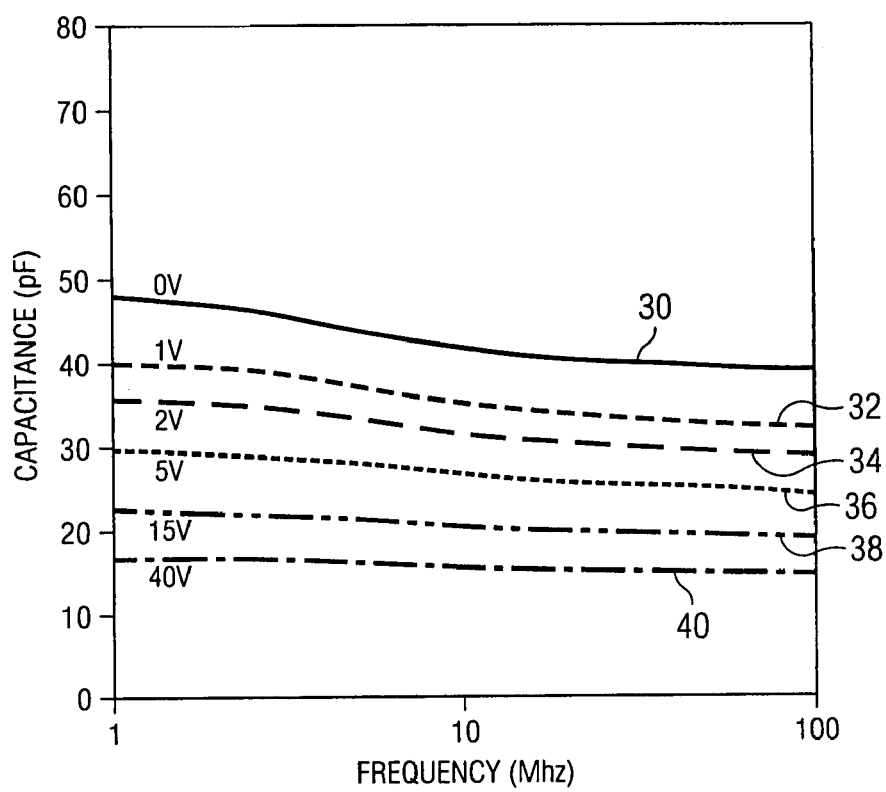
FIG. 2 is a graph depicting the capacitance/frequency characteristics of a bipolar thyristor device as a function of various bias voltages applied thereto.

FIG. 2 graphically illustrates the capacitance/frequency characteristics of a conventional bipolar overvoltage protection device, as a function of different voltages applied across the device. It is noted that the horizontal frequency axis is a logarithmic scale. In particular, the graph depicts the electrical characteristics of a Sidactor overvoltage protection device, part number P3100SCMC, available from Teccor Electronics. Line 30 depicts the capacitive/frequency characteristics of the device with 0 volts applied thereacross. Line 32 depicts the capacitive/frequency characteristics of the device with 1 volt applied thereacross. Line 34 depicts the capacitive/frequency characteristics of the device with 2 volts applied thereacross. Line 36 depicts the capacitive/frequency characteristics of the device with 5 volts applied thereacross. Line 38 depicts the capacitive/frequency characteristics of the device with 15 volts applied thereacross. Line 40 depicts the capacitive/frequency characteristics of the device with 40 volts applied thereacross. These electrical characteristics are those of the device while in a test circuit, without any other communication circuits connected thereto.

It is noted that with higher voltages applied across the bipolar overvoltage protection device, there is less change in capacitance as a function of frequency. This is generally true of most bipolar overvoltage protection devices. However, the problem encountered is that the voltage across an overvoltage protection device cannot generally be known or predicted at all times when connected to communication circuits or communication lines. Thus, when the voltage across such device is low, the other communication circuits will have to operate with the variations of capacitance of the overvoltage protection device. When transmitting VDSL and other high speed digital signals on a DSL line, this means either reducing the transmission speed to a rate less than otherwise would be necessary to accommodate the increased capacitance of the overvoltage protection device, or accept a higher error rate. Neither of these solutions is acceptable to either communication providers or users.

With reference back to FIG. 2, it is noted that for low voltages across the overvoltage protection device, namely between about one and five volts, the capacitance of the device changes substantially more than for higher voltages across the device. For the particular device of the example, and for a voltage of one volt applied across the device, the capacitance of the device changes about 5 pf, from about 40 pf to about 35 pf, between the frequency range of 1 MHz and 10 MHz. This represents about a 12.5% change in capacitance of the device. With the 1-volt potential applied across the device, the capacitance at 100 MHz is about 33 pf. Considering the same overvoltage protection device with a voltage of 40 volts across it, it is noted that the change in capacitance between 1 MHz and 10 MHz is about 1 pf (28 pf-27 pf), or about a 3.6% change in capacitance. At 100 MHz, the capacitance presented by the device with a 40 volt bias across it, is about 24 pf. The small degree of change in capacitance is seen from FIG. 2 by the linear 40-volt line. The other lines in the graph representing lower voltages across the device are much more non-linear. It can also be seen that by assuring there is a voltage greater in magnitude than normally applied across the device, there is a corresponding reduction in capacitive change within the device. As noted above, with larger voltages applied across a bipolar semiconductor junction, there is a wider depletion region between the conductive regions (the capacitor plates) of the device, and thus less capacitance.

In accordance with an important feature of the invention, a bias voltage is applied to the overvoltage protection device 44 so that it operates in a continuous manner with a lower capacitance, thereby allowing communication lines to operate with optimal speed and bandwidth. By assuring that there is always at least a predetermined voltage across the overvoltage protection device, it is assured that the communication line connected thereto undergoes a minimal degree of change in capacitance—at least the capacitance contributed by the overvoltage protection device. The foregoing advantage is also realized in situations where the overvoltage protection device experiences changes in frequency and temperature.

FIG. 1 illustrates an overvoltage protection circuit 10 employing a floating bias supply voltage. Here, a Sidactor overvoltage protection device 44 is a unidirectional bipolar device that is connected to a communication line which includes a tip conductor 12 and a ring conductor 14. The tip conductor 12 and the ring conductor 14 are connected to nodes 68 and 69 of the overvoltage protection device 44 by respective diode pairs of the bridge 46. The tip conductor 12 is connected to the overvoltage protection device 44 by way of diode pairs 52 and 54, while the ring conductor 14 is connected to the overvoltage protection device 44 by diode pairs 56 and 58. The overvoltage protection device 44 is connected to ground 50 via nodes 68 and 69 by way of diode pairs 60 and 62. In particular, the cathode of diode 62 is connected to ground 50 and the anode of diode 60 is connected to ground 50. Overvoltages of either polarity can be conducted in a conventional manner from either the tip conductor 12 or the ring conductor 14, or both, to ground 50 through the various diodes of the bridge 46. As can be seen, the various current paths through the overvoltage protection device 44 include a first diode, the overvoltage protection device 44, and then a second diode. The three components are all in series, thus reducing the effective capacitance presented by the overvoltage protection circuit 10 to the communication line 12 and 14.

The bias voltage of the supply 48 is applied across the terminals of the overvoltage protection device 44. The bias voltage is preferably a DC voltage and is applied to the overvoltage protection device 44 on a continuous basis. Alternatively, the bias voltage can be applied only during the time when the communication line 12 and 14 is active in transmitting communication signals.

The bias voltage is applied to the overvoltage protection device 44 by the bias voltage supply 48, through at least one isolation resistor 64 in the floating bias supply embodiment, and preferably two isolation resistors, one shown as optional isolation resistor 66. The isolation resistors 64 and 66 are of sufficiently high resistance so as to provide isolation between the bias voltage supply 48 and the overvoltage protection device 44 when the latter is driven into a conductive state in response to an overvoltage. In practice, the isolation resistors 64 and 66 can be on the order of one megohm each, or larger. However, in certain applications, the value of each resistor 64 and 66 could be as low as several hundred ohms. During periods of time when an overvoltage on the communication line 12 and 14 triggers the overvoltage protection device 44 into conduction, the presence of the bias voltage does not otherwise affect the breakover voltage or other electrical characteristics of the overvoltage protection device 44.

The polarity of the bias voltage supply 48 is chosen such that the diodes of the bridge 46 are reverse biased during normal operation of the communication line 12 and 14. While the bias voltage supply 48 is shown non-referenced to ground, i.e., floating, in other communication line situations, the overvoltage protection circuit can be configured differently. In the various configuration of the bias voltage supply, it is important to note that the positive terminal of the bias voltage supply should not be negative with respect to ground, and the negative terminal should not be positive with respect to ground.

In operation of the overvoltage protection circuit of FIG. 1, it is assumed that the bias voltage of the supply 48 is a) greater than the highest operating voltage of the communication line, and b) lower than the breakover voltage of the overvoltage protection device 44. As will be described below, the constraint a) is not necessary when using a blocking diode in series with the bias voltage supply 48. The capacitance of the overvoltage protection device 44 remains relatively unchanged due to the constant bias voltage applied across the device 44. Changes in line voltage change the capacitance of the bridge diodes because the voltage across the diodes changes with line voltage. As noted above, when operating with high data rates or in other environments where circuit capacitance changes are critical and undesirable, the biasing of overvoltage protection devices 44 can improve communication line performance and reduce data transmission errors.

The overvoltage protection circuit 10 of FIG. 1 functions for its intended purpose, with several considerations. First, and as noted above, the overvoltage protection device 44 is preferably selected with a breakover voltage greater than high voltages normally transmitted on the communication line, such as signaling or ringing voltages, which are generally greater in magnitude than the battery voltage or the voice or data signals. Secondly, the magnitude of the bias voltage 48 should be greater than any voltage normally encountered on the communication line. If these considerations were not heretofore adhered to, the overvoltage protection device 44 would be driven into conduction by high operating voltages other than overvoltages inadvertently coupled to the communication line, or the various diodes of the bridge may be forward biased even in the absence of an overvoltage coupled to the communication line.

Figure 3:
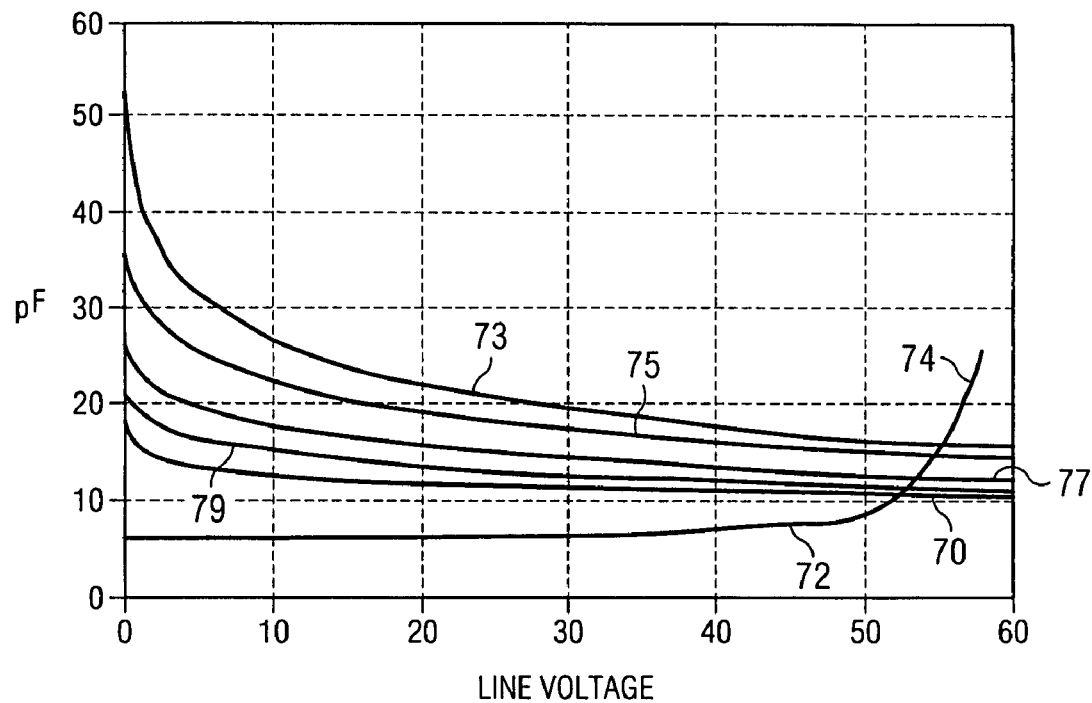
FIG. 3 is graphically depicts the capacitance/line voltage characteristics of various overvoltage protection devices, and of the overvoltage protection circuit of FIG. 1, during different conditions of the communication line, and without the blocking diode of the invention.

The graph of FIG. 3 illustrates the capacitive characteristics of various thyristor devices as a function of line voltage. Line 73 of the graph illustrates the capacitance characteristics of a single Sidactor overvoltage protection device (P2600SCMC) having a 260 volt breakover voltage. Line 75 illustrates the capacitive characteristics of two series-connected Sidactor overvoltage protection devices (P2703ACMC), each having a 135 volt breakover voltage. Line 77 illustrates the capacitive characteristics of four series-connected Sidactor overvoltage protection devices (P0720SCMC), each having a 72 volt breakover voltage. Line 79 illustrates the capacitive characteristics of another Sidactor overvoltage protection device (P3100SCMC) connected in series with a pair of antiparallel MUR diodes. It is noted that the line voltage of a VDSL2 line is represented by the horizontal axis of FIG. 3.

When a semiconductor overvoltage protection circuit 10, such as the type shown in FIG. 1, is coupled across a twisted pair tip and ring type of communication line, the capacitance/line voltage characteristics of such circuit are as shown by lines 70 and 72 in FIG. 3. Line 70 of the graph illustrates that the capacitance of the overvoltage protection circuit 10 is about 12 pf with zero bias applied across the overvoltage device 44. In other words, the bias voltage 48 shown in FIG. 1 is open circuited. When the bias voltage 48 of the device 44 in the overvoltage protection circuit 10 is increased to about 53 volts, the capacitance/line voltage characteristics are as shown by line 72 in FIG. 3. In this event, it can be seen that the capacitance is lowered to about 7 pf and is relatively linear until the communication line voltage exceeds the 53-volt bias voltage. When the line voltage on either the tip conductor 12 or the ring conductor 14 exceeds the voltage of the bias supply 48, the capacitance rises abruptly, as shown by rising portion 74 of the graphical line 72. This sharp increase in the capacitance is undesirable and can represent unstable electrical conditions on the communication line and thus cause data transmission errors.

The different voltages experienced across an overvoltage protection circuit can be appreciated by noting that the most severe conditions are at low line voltages, where the various semiconductor overvoltage protection devices present a large variation in capacitance to the communication line. This can occur during dry conditions of the communication line, where the line is effectively unpowered during times that the telephone line is carrying concentrated traffic, as compared to an individual telephone conversation. The line voltage during this state of the telephone line can be between 0 volts and about 4 volts. During off-hook conditions of the communication line, the voltage across the tip and ring conductors can be between 8 volts and 20 volts. Active telephone conversations are carried on the telephone line during off-hook conditions. When a telephone set is placed in an on-hook condition, the voltage between the tip and ring conductors can be between 48 volts and 56 volts. These voltages are only nominal values. In practice, the line voltages may differ significantly from the values noted above, based on line conditions and other circumstances. In a telephone line that is adapted for carrying data signals, the telephone set may indeed be on hook, but a modem may be connected to the communication line and actively transmitting data signals.

The data transmission errors referred to above can occur when, for example, a user of a high speed communication line is transmitting or receiving data via a modem or other data interface, and the line suddenly undergoes a high voltage, such as a ringing voltage or an off-hook condition on the communication line. During those periods when the line voltage exceeds 53 volts, in the example, the capacitance of the overvoltage protection circuit abruptly rises. This sudden increase in the capacitance connected across the communication line can disrupt the electrical parameters of the communication line to which the data modem was initially equalized during installation or subsequent rebooting. When the communication line exhibits a different capacitance, namely an increase in capacitance, the electrical match between the data modem and the communication line is upset and thus transmission errors can occur.

Assume for purposes of example that a voltage exceeding the 53-volt bias voltage, such as a 100-volt signal, is applied to the tip conductor 12 of the circuit of FIG. 1. If the breakover voltage of the overvoltage protection device 44 is greater than 100 volts, such device 44 will remain in the non-conductive state. However, the diode 52 of the bridge 46 will become forward biased, and current will flow through the isolation resistor 64 and into the bias supply 48 (in a reverse direction), and then to the ring conductor 14 via the other isolation resistor 66, and bridge diode 58. Alternatively, the current may flow to ground from the bias supply 48 if such supply is of the grounded type. When current flows through the bias supply 48 in the reverse direction, the capacitance presented to the communication line sharply increases, as shown in the upturned line 74 of FIG. 3, and data transmission errors can occur. It is believed that when the junction of one or more of the bridge diodes becomes forward biased, the capacitance of the bias voltage supply comes into play and contributes significantly to increased capacitance of the overvoltage protection circuit 10.

Figure 4:
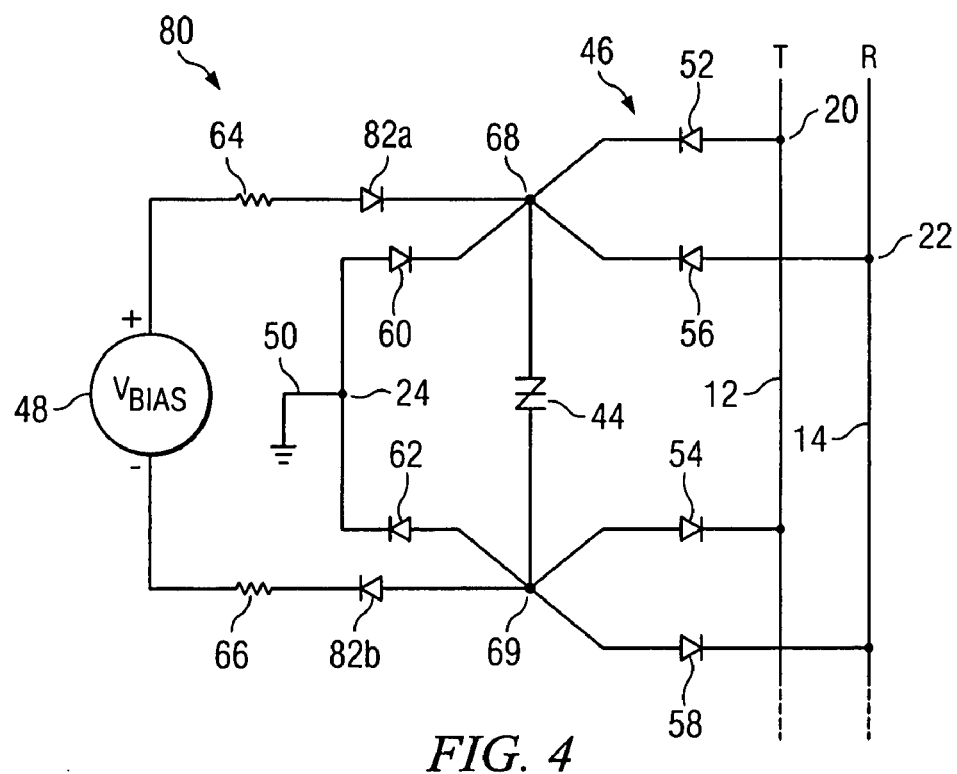
FIG. 4 is a schematic drawing of an overvoltage protection circuit incorporating a blocking diode.

In accordance with an important feature of the invention, current is prevented from flowing into the bias voltage supply through forward biased bridge diodes by communication line voltages. This is prevented by the use of a blocking diode 82a, as shown in the overvoltage protection circuit 80 of FIG. 4. While a single blocking diode 82a can be used, it is preferable to use a pair of blocking diodes 82a and 82b. The circuit 80 of FIG. 4 is essentially the same as that shown in FIG. 1, and includes many of the same low capacitance advantages, except for the addition of the blocking diodes 82a and 82b. The blocking diode 82a is poled so that leakage current from the bias voltage supply 48 can pass through the forward-biased blocking diode 82a and to the overvoltage device 44. However, in the event of the application of a high voltage on the communication line, such as a ringing voltage, on either the tip conductor 12 or the ring conductor 14, the blocking diode 82a is reverse biased. In other words, with the overvoltage protection circuit 80 of FIG. 4, current flow into the bias voltage supply 48 in response to a high line voltage on the communication line is prevented as the current paths each have the reverse-biased blocking diode 82a and 82b therein.

In a preferred embodiment of the invention shown in FIG. 4, the overvoltage protection device 44 is connected between opposite nodes 68 and 69 of the diode bridge 46. The isolation resistor 64 and optional isolation resistor 66 are also coupled to the respective nodes 68 and 69, through respective blocking diodes 82a and 82b. The isolation resistors 64 and 66 function to isolate the bias voltage supply 48 from the diode bridge nodes 68 and 69. In other words, when an overvoltage on the communication line drives the overvoltage protection device 44 into conduction, the bias voltage supply 48 is not effectively short circuited. The tip conductor 12 of the communication line is connected to a node 20 of the bridge 46 defined by the cathode of diode 52 and the anode of diode 54. The ring conductor 14 of the communication line is connected to a node 22 of the bridge 46 defined by the anode of diode 56 and the cathode of diode 58. A circuit ground 50 or other reference potential is connected to a node 24 of the bridge defined by the anode of diode 60 and the cathode of diode 62.

The blocking diode 82a can be the only blocking diode employed in the overvoltage protection circuit 80 shown in FIG. 4. In like manner, the blocking diode 82b can be the only blocking diode employed, and can be placed on the negative side of the bias voltage supply 48. In this latter event, the blocking diode 82b would be poled so that current resulting from a high voltage on the communication line is prevented from flowing through the bridge diodes and through the bias voltage supply 48. Preferably, both blocking diode 82a and 82b are placed in both the positive and negative supply lines on the bridge side of the isolation resistors 64 and 66. Although the blocking diodes 82a and 82b can be placed on either side of the respective isolation resistors 64 and 66, it is preferable to place the blocking diodes 82a and 82b on the bridge side of the isolation resistors 64 and 66. The reason for this is the blocking diodes 82a and 82b can then be fabricated in a semiconductor chip along with the bridge diodes. The blocking diode(s) can be placed in overvoltage protection circuits at many locations so that undesired leakage currents do not flow through the bias voltage supply 48 in a reverse direction. Indeed, if it is found in other types of overvoltage protection circuits that similar leakage current paths exist in response to high line voltages, blocking diodes can be employed to block such currents and maintain a relatively constant capacitance characteristic of such overvoltage protection circuits.

Figure 5:
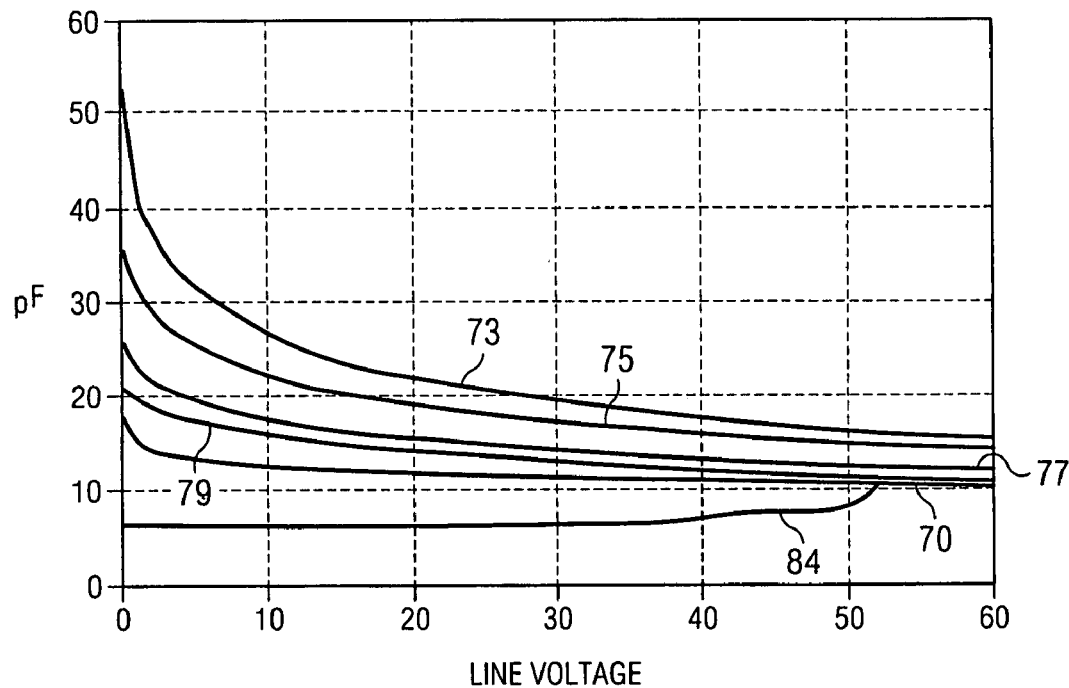
FIG. 5 is a graph similar to that of FIG. 3, but showing the different characteristics of the overvoltage protection circuit of FIG. 4 when the communication line voltage exceeds the bias voltage, and with the blocking diode of the invention.

FIG. 5 illustrates the capacitance/line voltage characteristics of the overvoltage protection circuit 80 of FIG. 4. Graphical lines 73, 75, 77, 79 and 70 illustrate the capacitive characteristics of the overvoltage protection circuit 80, without a bias voltage applied across the overvoltage protection device 44, and with various different configurations of overvoltage protection devices described above. The graphical line 84 illustrates the capacitive characteristics of the overvoltage protection circuit 80 of FIG. 4, with a 53 volt bias applied across the overvoltage protection device 44. The graphical line 84 is generally linear through the voltage range of the communication line, but rises somewhat starting with a line voltage at about 50 volts. At about 53 volts, the line 84 continues in a manner coincident with the line 70 which represents zero bias applied to the overvoltage protection device 44. Importantly, in the overvoltage protection circuit 80, the capacitance is never greater than the case where a bias voltage of zero volts (line 70) is applied across the overvoltage protection device 44. In contrast to that of FIG. 3 (shown by line 72), the line 84 of FIG. 5 does not increase in capacitance above the zero bias value when a voltage greater than the bias voltage supply 48 is applied to one or both conductors 12 or 14 of the communication line. With a relatively constant capacitance exhibited by the overvoltage protection circuit 80, fewer data transmission errors will be encountered.

In accordance with an important feature of the invention, it is no longer necessary to provide a bias voltage that is greater than line voltages normally encountered on the communication line, even ring voltages. With the utilization of the blocking diodes 82a and 82b, the bias voltage can be much less than voltages normally encountered on the communication line, whereupon current is prevented from flowing into the bias voltage supply 48 which would otherwise cause additional capacitance to be imposed on the overvoltage protection circuit 80. With a virtually flat capacitance loading characteristic, the overvoltage protection circuit 80 can be incorporated with ease into many different types and configurations of communication lines. Indeed, one or a few generic overvoltage protection circuits can be provided for use with a large variety of communication lines, without concern of the magnitude of line voltages normally carried by the lines. The design of data modems and other line interface circuits is made much easier and is simplified when the capacitance loading characteristics of the overvoltage protection circuit are generally independent of signal frequencies, data rate or line voltages. Stated another way, the same bias voltage supply (magnitude) can be used without regard to the line voltages experienced in different communication line applications.

Figure 6:
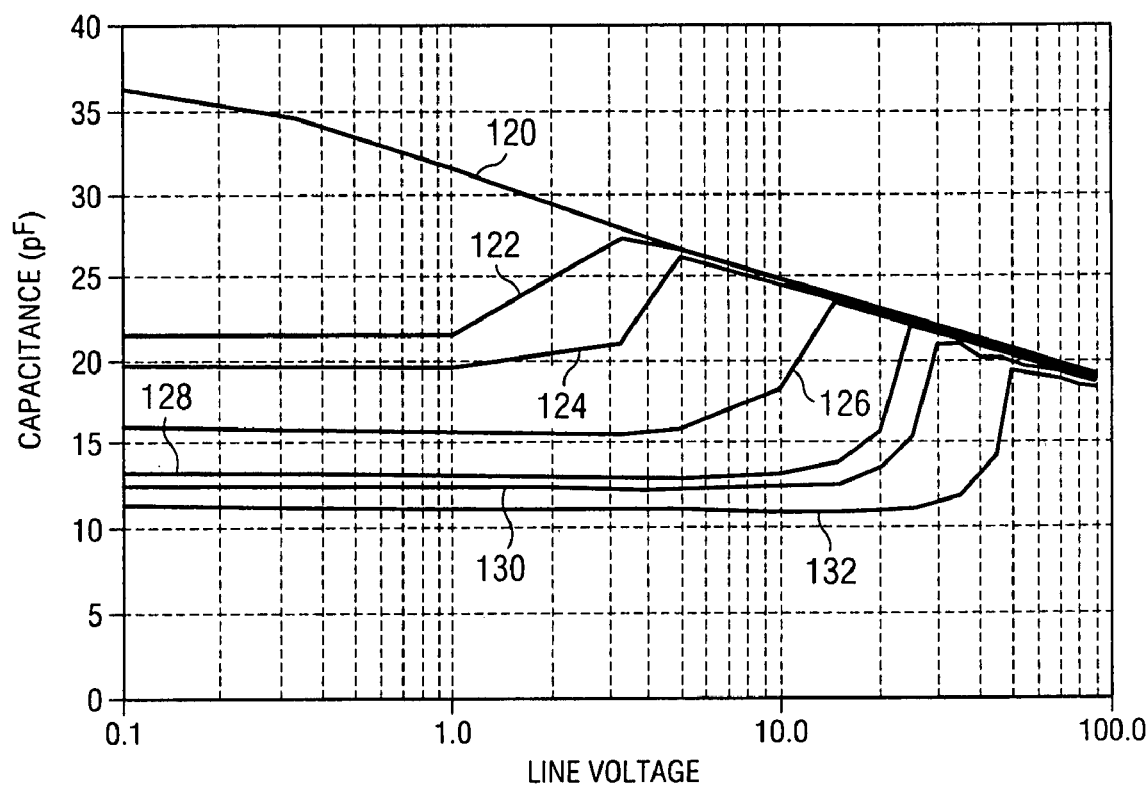
FIG. 6 is a graph illustrating the capacitive characteristics of an overvoltage protection circuit of the invention, with different magnitudes of a bias voltage applied across the overvoltage protection device.

FIG. 6 graphically illustrates the general capacitance characteristics of an overvoltage protection circuit similar to that described above in connection with FIG. 4, with different bias voltages applied to the overvoltage protection device 44. Graphical line 120 represents the capacitive characteristics of the circuit when a zero bias voltage is applied across the device 44. As the line voltage increases in a logarithmic manner, as depicted on the horizontal axis of the graph, the capacitance decreases. This is because the depletion region in the bipolar junction of the overvoltage protection device 44 widens, thus increasing the effective spacing between the capacitor plates and decreasing the capacitance. With no bias voltage applied across the overvoltage protection device 44, the capacitance continues to vary with line voltage, which represents undesirable changing electrical characteristics.

Line 122 of the graph of FIG. 6 represents the capacitive characteristics of the overvoltage protection circuit with a 3.3 volt bias applied across the overvoltage protection circuit. Here, the capacitive characteristics of the circuit remain essentially constant up to about one volt, then increase up to the value representative of a zero volt bias, and thereafter remain consistent with the capacitive characteristics of the zero volt bias of line 120. The upward breaks or turns of the capacitance represented by line 122, and the other lines of the graph, are believed to be capacitance contributed by the forward biasing of a diode bridge by the line voltage. Line 124 is representative of th capacitive characteristics of the circuit with a 5.0 volt bias voltage. Line 126 represents the capacitance as a function of the bias voltage of 12.0 volts. Lines 128, 130 and 132 represent the capacitance when the bias voltage is respectively 24.0, 30.0 and 50.0 volts. As can be seen, with bias voltages of greater magnitude, te capacitance remains relatively flat and constant over a wider line voltage range. When employing the blocking diode(s) in the bias circuit, there is no instance in which the capacitance increase above that when no bias voltage is utilized at all.

Figure 7:
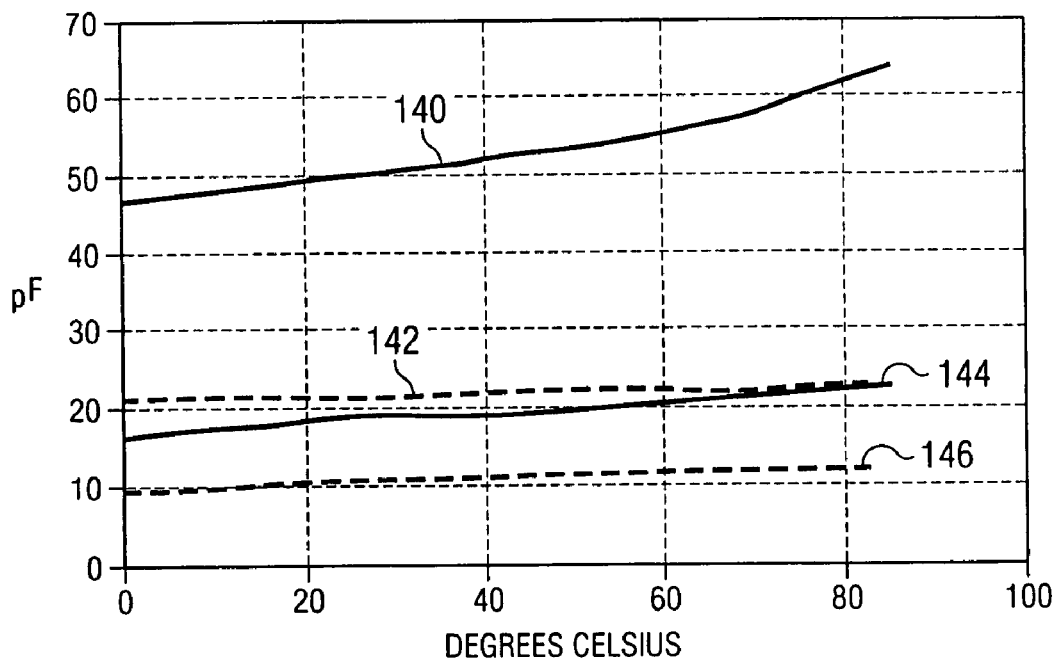
FIG. 7 is a graph illustrating the capacitive characteristics of an overvoltage protection circuit of the invention as a function of temperature, for two different overvoltage protection devices.

FIG. 7 is a graph which depicts the capacitance characteristics of an overvoltage protection device used with the invention, as a function of temperature. The solid line 140 is the capacitive characteristics of the circuit using a P3002SB Sidactor overvoltage protection device obtainable under the brand name Teccor, from Littlefuse, Inc. The line 140 is the capacitive characteristics with a zero bias applied to the Sidactor device. Broken line 142 also depicts the capacitive characteristics of such device as a function of temperature, but with a 15.0 volt bias employed. It can be seen that when a bias voltage is applied to the overvoltage protection device, the change in capacitance is reduced and is relatively independent of changes in temperature. Solid line 144 and broken line 146 represent the respective capacitive characteristics of an overvoltage protection circuit of the invention using a Sidactor P3100SCMC overvoltage protection device. Line 144 depicts the capacitive characteristics as a function of temperature with zero bias applied to the Sidactor device. Line 146 depicts the capacitive characteristics as a function of temperature with a 15.0 volt bias applied to the Sidactor device. Again, when a bias voltage is applied to the overvoltage protection device, the capacitance varies much less with changes in temperature. This feature of the invention has been found to be advantageous in a number of areas, including the gigabit Ethernet area where the use of a bias voltage has been found to substantially reduce the transmission errors as a function of changes in temperature.

Figure 8:
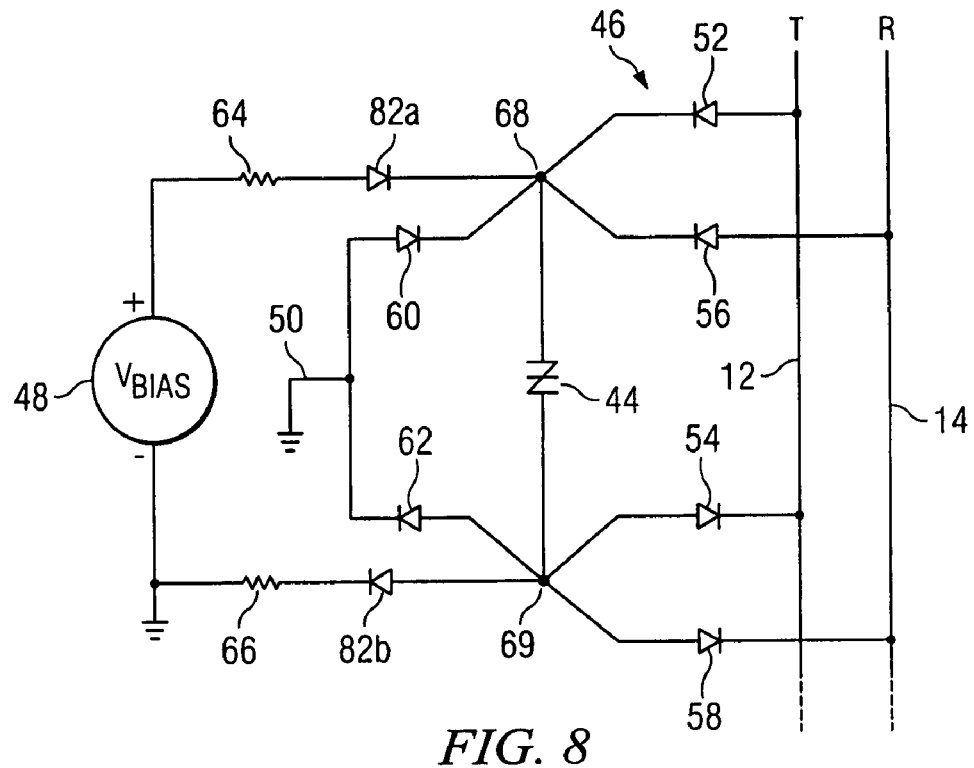
FIG. 8 is another embodiment of the invention utilizing a grounded bias voltage supply.

As noted above, the overvoltage protection circuit of the invention need not operate with a floating bias voltage supply. Rather, a ground referenced bias voltage supply can be employed, as shown in FIG. 8. Here, the negative terminal of the bias voltage supply 48 is grounded. Similarly, the isolation resistor 66 is also grounded and placed in series with the second blocking diode 82b. In order to maintain an isolated circuit, the second isolation resistor 66 is necessary. In all other respects, the overvoltage protection circuit of FIG. 6 provides the same advantages as that described above.

Figure 9:
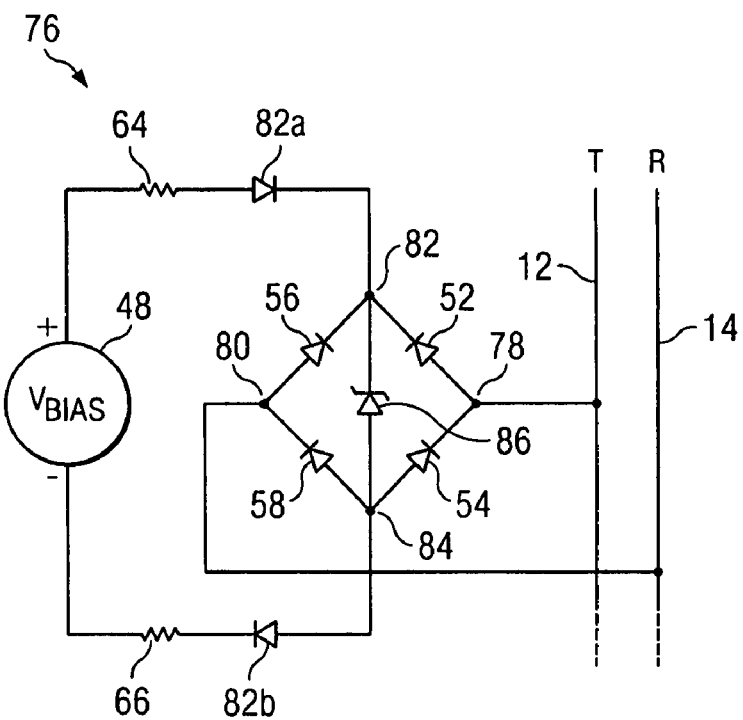
FIG. 9 is yet another embodiment of the invention employing a four-diode bridge and a TVS device.

FIG. 9 illustrates an overvoltage protection circuit 76 employing a four-diode bridge. The overvoltage protection circuit 76 is well adapted for minimizing capacitive loading of the communication line. This protection circuit 76 includes a bridge constructed with four diodes with nodes 78 and 80 connected respectively to the tip conductor 12 and the ring conductor 14 of the communication line. Nodes 82 and 84 of the diode bridge are connected to respective blocking diodes 82a and 82b. The isolation resistors 64 and 66 are connected in series with the respective blocking diodes 82a and 82b, and coupled to the bias voltage supply 48 for providing a bias voltage across a threshold device 86, such as a TVS device 86, which could be a Zener diode or a host of other threshold devices. The TVS device 86 can be selected to provide a reverse breakdown voltage suitable for the application involved. The bias voltage provides the same function as described above in connection with the FIG. 4 embodiment above. In addition, the diodes 52, 54, 56 and 58 of the bridge can be either constructed or selected for low capacitance, i.e., can include junction areas that accommodate only 100%-150% of the surge current capability of the overvoltage protection device utilized. In other words, the capacitance of the bridge diodes is minimized by controlling the current carrying capability thereof, and not making the diode current capability larger than necessary.

Figure 10:
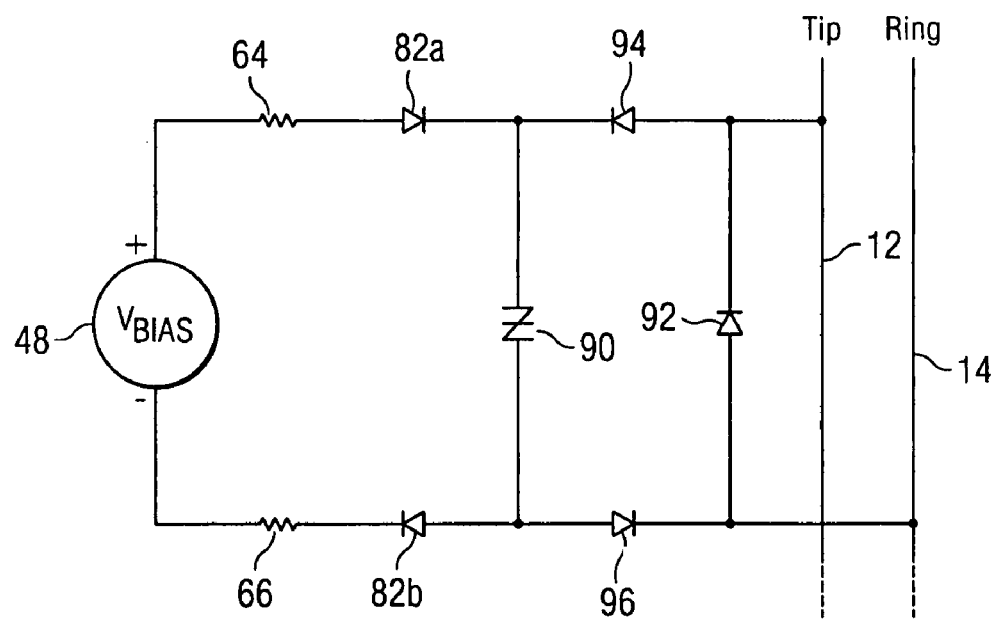
FIG. 10 is another overvoltage protection circuit which incorporates a bias voltage, a blocking diode and a unidirectional overvoltage protection device.

While the overvoltage protection circuit 80 shown in FIG. 4 may provide particular advantages, the features of the invention are not limited to such overvoltage protection circuit. FIG. 10 illustrates another application for the utilization of the invention. Here, unidirectional protection is provided to the tip and ring conductors 12 and 14 by an overvoltage protection device 90, as some communication line circuits require only such type of protection. The positive terminal of the bias voltage supply 48 is connected through the isolation resistor 64 to the anode of the blocking diode 82a. The cathode of the blocking diode 82a is connected to one terminal of a unidirectional overvoltage protection device 90. In like manner, the negative terminal of the bias voltage supply 48 is connected to the isolation resistor 66 which, in turn, is connected to the cathode of the second blocking diode 82b. The anode of the blocking diode 82b is connected to the other terminal of the unidirectional overvoltage protection device 90. The cathode of a diode 94 is connected to the cathode of the blocking diode 82a, and the anode of a diode 96 is connected to the anode of the other blocking diode 82b. The anode of the diode 94 is connected to the cathode of a diode 92, as well as connected to the ring conductor 12. The cathode of the diode 96 is connected to the anode of the diode 92, as well as to the ring conductor 14.

As can be appreciated, the unidirectional overvoltage protection device 90 is biased with a bias voltage 48 to linearize the capacitance characteristics thereof. The isolation resistors 64 and 66, as well as the blocking diodes 82a and 82b, provide the same functions described above. The diodes 94 and 96 prevent the bias voltage 48 from biasing the tip conductor 12 or the ring conductor 14. In operation, when a positive overvoltage is applied to the tip conductor 12, the overvoltage protection device 90 breaks down and conducts the resulting current. The current resulting form the overvoltage passes through the diode 94, the overvoltage protection device 90 the diode 96 and to the tip conductor 14. In the event of a positive overvoltage on the tip conductor 14, the resulting current passes through the diode 92 to the tip conductor 12. Again, the magnitude of the bias voltage supply 48 can be smaller than communication line voltages normally encountered on such line.

In the implementation of the blocking diode or diodes, those skilled in the art may find it expedient to fabricate a semiconductor chip that incorporates the blocking diodes 82a and 82b together on the same chip with one or more of the bridge diodes. For example, the blocking diode 82a of the FIG. 4 embodiment could be fabricated in the same chip as used to fabricate the bridge diodes 52, 56 and 60, with all four diode cathodes connected in common. In this event, the blocking diode 82a would be connected between the bridge node 68 and the isolation resistor 64. In like manner, the blocking diode 82b can placed in the negative bias voltage supply circuit and be fabricated in the same chip as the bridge diodes 54, 58 and 62, where all of the diode anodes are connected in common. In this event, the blocking diode would be connected between the anodes of the bridge diodes 54, 58 and 62, and the isolation resistor 66. The bridge diodes 60 and 62 are preferably constructed so as to have a current carrying capability about twice that of the other bridge diodes. This is because each diode 60 or 62 may be required to carry currents resulting from overvoltages occurring simultaneously on both tip and ring conductors 12 and 14.

In accordance with the concepts of the invention, the various embodiments of the overvoltage protection circuits provide enhanced and superior performance over the protection circuits known in the art. A few guidelines in biasing the circuits according to the invention can be set forth as follows. The positive voltage of the bias voltage should preferably not be less than zero volts. The negative voltage of the bias voltage should preferably not be greater than zero volts. Lastly, the bias voltage should be less than the breakover or threshold voltage of the overvoltage protection device used. It should be appreciated that these are only guidelines, as there may be situations where the principles and concepts of the invention can be employed without abiding by some or all of the guidelines. As can be appreciated, the practice of the invention no longer requires that the bias voltage be greater than the communication line voltage.

Figure 11:
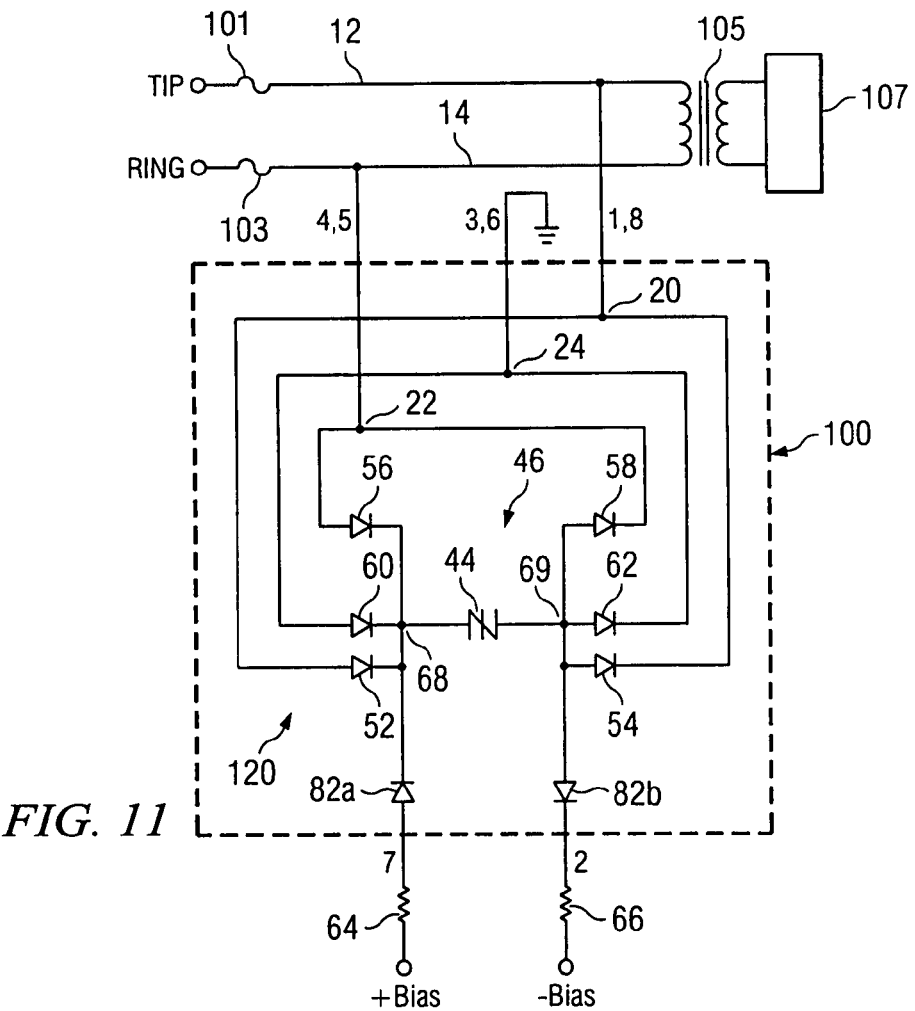
FIG. 11 is a diagram illustrating a module incorporating the overvoltage protection circuit according to the invention.
Figure 12:
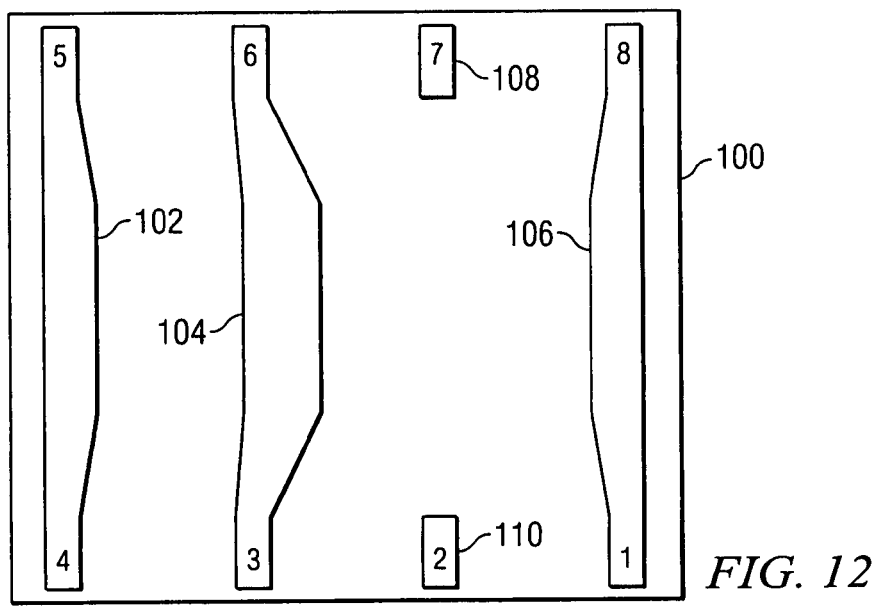
FIG. 12 is a drawing illustrating the pinout of a QFN package embodying an overvoltage protection circuit of the invention.

FIG. 11 illustrates an embodiment of the overvoltage protection circuit 120 packaged in a module. FIG. 12 shows the pinout of the QFN package 100, and also illustrates the conductor paths and conductor pads to which the components of the overvoltage protection circuit 120 are connected. The module is a QFN surface mount package 100, well adapted for use with telephone line interface units, and other communication lines. As can be seen, the tip and ring terminals of the overvoltage protection circuit are bridged across the respective communication line conductors 12 and 14. The ground conductor is connected to the communication line circuit ground. The communication line illustrated includes a pair of fuses 101 and 103 to provide overcurrent protection to the respective conductors 12 and 44 and circuits connected thereto. Other overcurrent protection circuits and devices can be employed, including positive temperature coefficient resistors. In the example, the communication line is connected to the primary of a line transformer 105. The secondary of the line transformer 105 is connected to a chipset 107 adapted for processing digital signals carried by the communication line. The chipset can be a DSL driver of the type processing DSL signals. Of course, the various overvoltage protection circuits of the invention can be coupled to a host of other communication lines with chipsets adapted for carrying many other digital signal protocols and formats.

The embodiment of the overvoltage protection circuit illustrated in FIG. 11 employs an external floating bias supply 48 coupled to the package 100 by way of external dual isolation resistors 64 and 66. The positive terminal of the bias voltage supply 48 is connected to the isolation resistor 64, and the negative terminal of the bias voltage supply 48 is connected to the isolation resistor 66. The other terminal of the isolation resistor 64 is connected to pin 7 of the package 100, and the other terminal of the isolation resistor 66 is connected to pin 2 of the package 100. Package terminals 1 and 8 are both connected to the communication line tip conductor 12. Package terminals 4 and 5 are both connected to the communication line ring conductor 14, and package terminals 3 and 6 are both connected to circuit ground.

The overvoltage protection circuit 120 of FIG. 11 includes a six-diode bridge 46, two blocking diodes 82a and 82b, and a Sidactor overvoltage protection device 44 obtainable from Littelfuse, Inc., Des Plaines, Ill., under the Teccor brand name. The Sidactor overvoltage protection device 44 can be selected to provide breakover voltages as low as 5-8 volts for Ethernet applications, 30 volts for dry loop applications, and 250-350 volts for DSL-over-POTS applications. According to one embodiment of the invention, the circuits and devices defining the overvoltage protection circuit include one chip fabricated with four diodes therein, namely diodes 52, 56, 60 and 82a. A second chip is fabricated to incorporate therein diodes 54, 58, 62 and 82b. A third chip includes the overvoltage protection device 44. The three semiconductor chips are interconnected to form the circuit shown in the outline of package 100 of FIG. 9.

The package 100 is fabricated with various metallic conductor paths and pads, all shown in FIG. 10. The package 100 is constructed with a ring conductor path 102, a large ground conductor path 104, a tip conductor path 106, a first isolation resistor conductor pad 108 and a second isolation resistor conductor pad 110. The QFN package 100 is preferably an 8-pin package. As noted above, the overvoltage protection circuit 120 can be easily implemented with a communication line interface without breaking or otherwise interrupting any conductor paths. Rather, the overvoltage protection circuit 120 is simply bridged across the existing tip conductor, ring conductor and ground conductor circuits of the line interface. In like manner, the overvoltage protection circuit 120 can be easily incorporated into new designs of communication line interface circuits. The ring conductor path 102 and the tip conductor path 106 are constructed as heavy metallic paths so that such paths can be inserted in series with existing ring and tip conductors without affecting the current-carrying capability of such conductors.

Node 22 of the diode bridge 46 is connected to the ring conductor path 102 which defines pins 4 and 5 of the package 100. Node 20 of the diode bridge 46 is connected to the tip conductor path 106 which defines pins 1 and 8 of the package 100. Node 24 of the diode bridge 46 is connected to the ground conductor path 104 which defines pins 3 and 6 of the package 100. One terminal of the customer-provided isolation resistor 64 is connected to the isolation resistor conductor pad 108 which defines pin 7 of the package 100. One terminal of the other isolation resistor 66 is connected to resistor conductor pad 110 which defines pin 2 of the package. As noted above, the isolation resistors 64 and 66 are preferably of a large value to provide electrical isolation between the bias voltage supply 48 and the overvoltage protection device 44 when the latter is driven into conduction.

The bias voltage supply 48 can be of any conventional type, including a regulated or unregulated reference supply. Bias voltage supplies of various voltages can be employed, depending on the application involved. As noted above, when the principles of the invention are employed, the voltage of the bias supply 48 need not be greater than the high voltages normally encountered on the communication line. The external bias voltage supply 46 is employed to bias the overvoltage protection device 44 to achieve a low capacitance circuit 10 well adapted for use with high speed digital communication lines. The positive terminal of the bias voltage supply 48 is connected to the terminal of isolation resistor 64. The negative terminal of the bias voltage supply 48 is connected to second isolation resistor 66.

One embodiment is described in connection with its integration into a QFN package. However, many other types of packages, including circuits with discrete components mounted on printed circuit boards, can be realized. Similarly, other packages with other pin configurations are readily achievable. Similarly, those skilled in the art can integrate all of the solid state components into a single chip, including the overvoltage protection device. Further, the entire overvoltage protection circuit, including the isolation resistors, can be incorporated into a single module. Even the bias voltage supply components can be incorporated into the same module as the overvoltage protection circuit.

While the foregoing overvoltage protection circuits are described in connection with the use of a Sidactor overvoltage protection device, other thyristor devices can be employed, whether gated or ungated. In addition, threshold devices, such as Zener diodes and TVS devices constructed with bipolar semiconductor technology, and other bipolar threshold devices, can be used with the invention and achieve reduced operating capacitance. The preferred embodiments described herein employ a communication line having a pair of conductors. This is not a restriction of the practice of the invention, as the concepts and principles can be applied to a communication line having a single conductor.

While the preferred and other embodiments of the invention have been disclosed with reference to specific overvoltage protection circuits, it is to be understood that many changes in detail may be made as a matter of engineering choices without departing from the spirit and scope of the invention, as defined by the appended claims.

What is claimed is:

1. An overvoltage protection circuit, comprising:
   a diode bridge;
   an overvoltage protection device connected between opposite nodes of said diode bridge;
   a terminal of said overvoltage protection circuit adapted for connection to a bias voltage to linearize a capacitance characteristics of said overvoltage protection device; and
   at least one blocking diode connected between the bias voltage terminal and said overvoltage protection device to prevent current from flowing in a reverse direction through a bias voltage supply providing said bias voltage.

2. The overvoltage protection circuit of claim 1, wherein said overvoltage protection circuit is adapted for connection to a communication line, and wherein said blocking diode is connected so that communication line voltages less than a breakover voltage of said overvoltage protection device and greater than a magnitude of said bias voltage prevents current from flowing into the bias voltage supply.

3. The overvoltage protection circuit of claim 1, further including an isolation resistor connected between the bias voltage terminal and said overvoltage protection device terminal.

4. The overvoltage protection circuit of claim 3, wherein the bias voltage supply includes a positive terminal connected to said overvoltage protection device through said isolation resistor, and said bias voltage supply has a negative terminal connected to a second terminal of said overvoltage protection device through a second isolation resistor.

5. The overvoltage protection circuit of claim 1, wherein said diode bridge includes at least four diodes, not including said blocking diode.

6. The overvoltage protection circuit of claim 1, wherein said diode bridge includes six diodes, not including said blocking diode.

7. The overvoltage protection circuit of claim 1, wherein said overvoltage protection device is connected between opposite nodes of said diode bridge, and said bias voltage is coupled between said opposite nodes.

8. The overvoltage protection circuit of claim 7, wherein a second node of said diode bridge is adapted for connection to a tip conductor of a communication line, and a third node of said diode bridge is adapted for connection to a ring conductor of said communication line.

9. The overvoltage protection circuit of claim 8, wherein a fourth node of said diode bridge is adapted for connection to a circuit ground.

10. The overvoltage protection circuit of claim 1, wherein said overvoltage protection circuit is adapted for connection to a communication line, and wherein said bias voltage is not applied to the communication line.

11. The overvoltage protection circuit of claim 1, further including a packaged module to which components of said overvoltage protection circuit are mounted, said packaged module having a positive bias voltage terminal adapted for connection to a positive voltage of a bias voltage supply, a negative bias voltage terminal adapted for connection to a negative voltage of the bias voltage supply, a tip terminal adapted for connection to a tip conductor of a communication line, a ring terminal adapted for connection to a ring conductor of the communication line, and a ground terminal adapted for connection to a reference voltage.

12. The overvoltage protection circuit of claim 1, further including two blocking diodes, a first blocking diode arranged to prevent current from flowing into a positive terminal of the bias voltage supply, and a second blocking diode arranged to prevent current from flowing out of a negative terminal of the bias voltage supply.

13. An overvoltage protection circuit, comprising:
   an overvoltage protection device responsive to an overvoltage for being driven into a low voltage conduction state;
   a conductor for coupling a DC bias voltage to said overvoltage protection device to lower a capacitance thereof; and at least one blocking diode in said bias voltage conductor, said blocking diode forward biased by said DC bias voltage.

14. The overvoltage protection circuit of claim 12, further including a bridge rectifier to which said overvoltage protection device is connected so that currents resulting from the overvoltage are carried through said overvoltage protection device in one direction.

15. The overvoltage protection circuit of claim 13, further including an isolation resistor for isolating a bias voltage supply from said overvoltage protection device.

16. An overvoltage protection circuit, comprising:
   a bridge rectifier having at least four diodes, a first and second diode of said bridge having cathodes thereof connected to a first node, and a third and fourth diode of said bridge having anodes thereof connected to a second node;
   an anode of said first diode and a cathode of said third diode connected to a third node of said bridge, wherein said third node of said bridge is adapted for connection to a first communication line conductor, and an anode of said second diode and a cathode of said fourth diode connected to a fourth node of said bridge, wherein said fourth node of said bridge is adapted for connection to a second communication line conductor;
   an overvoltage protection device connected between said first and second nodes of said bridge;
   a first blocking diode connected in series with a first isolation resistor to form a junction therebetween and first and second terminals, the first terminal of said series connected first blocking diode and first isolation resistor connected to the first node of said diode bridge, where said first blocking diode is arranged to allow current to flow into said first node of said diode bridge, and said second terminal of said series connected first blocking diode and first isolation resistor adapted for connection to a first terminal of a bias voltage supply; and
   a second blocking diode connected in series with a second isolation resistor to form a junction therebetween and third and fourth terminals, the third terminal of said series connected second blocking diode and second isolation resistor connected to the second node of said diode bridge, where said second blocking diode is arranged to allow current to flow out of said second node of said diode bridge, and said fourth terminal of said series connected second blocking diode and second isolation resistor adapted for connection to a second terminal of the bias voltage supply.

17. The overvoltage protection circuit of claim 16, further including;
   a fifth diode of said bridge, a cathode of said fifth bridge diode connected to said first node of said diode bridge;
   a sixth diode of said bridge, an anode of said sixth bridge diode connected to the second node of said diode bridge; and
   an anode of said fifth bridge diode adapted for connection to a reference voltage, and a cathode of said sixth bridge diode adapted for connection to the reference voltage.

18. The overvoltage protection circuit of claim 17, wherein said reference voltage comprises a ground potential.

19. A method of protecting a communication line from overvoltages, comprising the steps of:
   using a thyristor to provide overvoltage protection to a communication line;
   biasing the thyristor with a bias voltage to linearize the capacitance of the thyristor and reduce changes in capacitance with changes in voltages carried by the communication line; and
   preventing current from flowing in a reverse direction through a supply of the bias voltage to further linearize the capacitive loading of the thyristor when the voltage on the communication line exceeds the magnitude of the bias supply voltage.

20. The method of claim 19, further including using a unidirectional conducting thyristor and a diode bridge, where the bridge diodes are connected to the communication line to allow said thyristor to conduct in one direction in response to overvoltages of both polarities.

21. The method of claim 19, further including biasing said thyristor with a bias voltage to make the capacitance of said thyristor more independent of changes in voltage and temperature to which said thyristor is subjected.

* * * * *